United States Patent
Park et al.

(10) Patent No.: US 12,277,805 B1
(45) Date of Patent: Apr. 15, 2025

(54) ELECTRONIC DEVICE AND METHOD FOR REGISTERING AND AUTHENTICATING FINGERPRINT

(71) Applicant: Suprema Inc., Seongnam-si (KR)

(72) Inventors: Jae Hyun Park, Seongnam-si (KR); Jong Man Lee, Seongnam-si (KR); Young Mook Kang, Seongnam-si (KR); Hochul Shin, Seongnam-si (KR); Bong Seop Song, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 0 days.

(21) Appl. No.: 18/520,125

(22) Filed: Nov. 27, 2023

(30) Foreign Application Priority Data

Oct. 25, 2023 (KR) ........................ 10-2023-0143950

(51) Int. Cl.
*G06V 40/50* (2022.01)
*G06V 40/12* (2022.01)

(52) U.S. Cl.
CPC .......... *G06V 40/50* (2022.01); *G06V 40/1335* (2022.01); *G06V 40/1365* (2022.01)

(58) Field of Classification Search
CPC . G06V 40/50; G06V 40/1335; G06V 40/1365
See application file for complete search history.

(56) References Cited

U.S. PATENT DOCUMENTS

| 2016/0217312 | A1* | 7/2016 | Gardiner | H04L 63/0861 |
| 2018/0032788 | A1* | 2/2018 | Krenzer | G06V 40/1335 |
| 2019/0303644 | A1* | 10/2019 | Lee | G06V 10/46 |

* cited by examiner

*Primary Examiner* — Abhishek Sarma
(74) *Attorney, Agent, or Firm* — Bridgeway IP Law Group, PLLC; Jihun Kim (57) ABSTRACT

A method for registering a fingerprint of a user through an electronic device, comprising: sensing a fingerprint input into a fingerprint recognition area formed on a display module of the electronic device to capture at least one image of the fingerprint input; determining characteristics of the fingerprint input based on the at least one image of the fingerprint input when the fingerprint input is a rolled fingerprint; and storing the at least one image of the fingerprint input and the characteristics of the fingerprint input as personalized information of the user.

17 Claims, 9 Drawing Sheets

ELECTRONIC DEVICE AND METHOD FOR REGISTERING AND AUTHENTICATING FINGERPRINT

CROSS-REFERENCE TO RELATED APPLICATIONS

This application claims the priority of Korean Patent Application No. 10-2023-0143950 filed on Oct. 25, 2023, in the Korean Intellectual Property Office, the disclosure of which is incorporated herein by reference.

TECHNICAL FIELD

The present disclosure relates to technology for processing fingerprints of an electronic device having features such as display and touch recognition.

This work was supported by the Korea Advanced Institute of Science & Technology (KAIST) grant funded by the Ministry of Science and ICT to develop innovative convergence technology of communication and computing for superintelligence services (Project unique No.:

BACKGROUND

As mobile and network platforms become more common, electronic devices with various features are being released, but security issues, which are a trade-off to be accepted for the features, are still a major concern.

The security issues related to electronic devices are being improved through technologies for fingerprint recognition based on optical, capacitive, ultrasonic, etc, methods. However, for example, through fingerprint authentication, it is possible to unlock the smartphone of a drunken person or access others' banking applications, etc. without permission. Considering such cases where fingerprint authentication is used for crimes, security issues in certain situations still remain with regard to conventional technologies for recognizing fingerprints.

SUMMARY

The present disclosure is aimed at providing technology for processing fingerprints of an electronic device for improving security in fingerprint registration and recognition by using how each rolled fingerprint is input and the characteristics of each individual input fingerprint.

The present disclosure is aimed at providing the technology for processing fingerprints of the electronic device for enhancing security in fingerprint registration and recognition by using the characteristics of each individual rolled fingerprint in various ways.

According to the embodiment of the present disclosure, it may be possible to improve security in fingerprint recognition by using how each rolled fingerprint is input and the characteristics of each individual input fingerprint for fingerprint registration and recognition. According to the embodiment of the present disclosure, it may be possible to improve security and reliability in fingerprint recognition by using the direction in which a rolled fingerprint rolls, the time taken for the fingerprint to be input, the angle of the fingerprint, and the location where the fingerprint is input for fingerprint registration and recognition.

In accordance with a first aspect of the present disclosure, there is provided a method for registering a fingerprint of a user through an electronic device, comprising: sensing a fingerprint input into a fingerprint recognition area formed on a display module of the electronic device to capture at least one image of the fingerprint input; determining characteristics of the fingerprint input based on the at least one image of the fingerprint input when the fingerprint input is a rolled fingerprint; and storing the at least one image of the fingerprint input and the characteristics of the fingerprint input as personalized information of the user.

The fingerprint recognition area is a partial area of the display module, and the determining of the characteristics of the fingerprint input involves: determining an initial time for the fingerprint input in the partial area; determining a direction in which the rolled fingerprint based on the initial time for the fingerprint input; determining a final time for the fingerprint input in the partial area after the direction in which the rolled fingerprint has been determined; determining a total time required for the fingerprint input based on the initial time and the final time; and setting the direction in which the rolled fingerprint and the total time required for the fingerprint input as the characteristics of the fingerprint.

The direction in which the rolled fingerprint is determined based on a central axis of the rolled fingerprint consecutively captured in the partial area.

The fingerprint recognition area is a full area of the display module, and the determining of the characteristics of the fingerprint input involves: determining an initial time for the fingerprint input in the full area; determining a direction in which the rolled fingerprint based on the initial time for the fingerprint input; determining a final time for the fingerprint input in the full area after the direction in which the rolled fingerprint has been determined; determining a total time required for the fingerprint input based on the initial time and the final time; determining an angle of the rolled fingerprint based on the direction in which the rolled fingerprint and the final time for the fingerprint input; determining an input position of the rolled fingerprint during the total time required for the fingerprint input; and setting the direction in which the rolled fingerprint, the total time required for the fingerprint input, the angle of the rolled fingerprint, and the input position of the rolled fingerprint, as the characteristics of the fingerprint.

The direction in which the rolled fingerprint is determined based on a central axis of the rolled fingerprint consecutively captured in the full area.

The angle of the rolled fingerprint is obtained by determining the tilt of the rolled fingerprint on X and Y axis in the full area based on the central axis of the rolled fingerprint captured in the full area during the total time required for the fingerprint input.

The input position of the rolled fingerprint is determined based on coordinates of the X and Y axis on a central axis of the rolled fingerprint in the full area.

In accordance with a second aspect of the present disclosure, there is provided a method for authenticating a fingerprint of a user through an electronic device, comprising: sensing a fingerprint input into a fingerprint recognition area formed on a display module of the electronic device to capture at least one image of the fingerprint input and determining whether the at least one image of the fingerprint input matches a pre-stored at least one image of the fingerprint input when the fingerprint input is a rolled fingerprint; determining characteristics of the rolled fingerprint input into the fingerprint recognition area the at least one image of the fingerprint input matches the pre-stored the at least one of the fingerprint input; loading personalized information related to pre-stored characteristics of the rolled fingerprint input; determining whether the characteristics of the rolled fingerprint input match the personalized information; and outputting the result of authentication of the fingerprint when the characteristics of the rolled fingerprint input match the personalized information.

The fingerprint recognition area is a partial area of the display module, and the determining of the characteristics of the fingerprint input involves: determining an initial time for the fingerprint input in the partial area; determining a direction in which the rolled fingerprint based on the initial time for the fingerprint input; determining a final time for the fingerprint input in the partial area after the direction in which the rolled fingerprint has been determined; and determining a total time required for the fingerprint input based on the initial time and the final time.

The direction in which the rolled fingerprint is determined based on a central axis of the rolled fingerprint consecutively captured in the partial area.

The fingerprint recognition area is a full area of the display module, and the determining of the characteristics of the fingerprint input involves: determining am initial time for the fingerprint input in the full area; determining a direction in which the rolled fingerprint based on the initial time for the fingerprint input; determining a final time for the fingerprint input in the full area after the direction in which the rolled fingerprint has been determined; determining a total time required for the fingerprint input based on the initial time and the final time; determining an angle of the rolled fingerprint based on the direction in which the rolled fingerprint and the final time for the fingerprint input; and determining an input position of the rolled fingerprint during the total time required for the rolled fingerprint input.

The direction in which the rolled fingerprint is determined based on a central axis of the rolled fingerprint consecutively captured in the full area.

The angle of the rolled fingerprint is obtained by determining the tilt of the rolled fingerprint on X and Y axis in the full area based on the central axis of the rolled fingerprint captured in the full area during the total time required for the fingerprint input.

The input position of the rolled fingerprint is determined based on coordinates of the X and Y-axis on a central axis of the rolled fingerprint in the full area.

In accordance with a second aspect of the present disclosure, there is provided an electronic device comprising: a display module; a fingerprint recognition module included in the display module; a signal processing unit that senses a fingerprint input into a fingerprint recognition area through the fingerprint recognition module; and a control unit that processes at least one image of the fingerprint input and characteristics of the fingerprint into personalized information and stores them in a storage unit when the fingerprint input is a rolled fingerprint, loads the personalized information from the storage unit at the request for authentication of the rolled fingerprint, and outputs the result of authenticating the rolled fingerprint based on whether of the at least one image of the fingerprint input and the characteristics of the fingerprint match the personalized information.

The fingerprint recognition area is formed over a partial area of the display module, and the control unit includes: a characteristic determination unit that determines an initial time for the rolled fingerprint input in the partial area, determines a direction in which the rolled fingerprint based on the initial time for the fingerprint input, determines a final time for the fingerprint input in the partial area after the direction in which the rolled fingerprint has been determined, and determines a total time required for the fingerprint input based on the initial time and the final time; an information management unit that manages the direction in which the rolled fingerprint and the total time required for the fingerprint input as the personalized information; and a fingerprint authentication unit that authenticates the rolled fingerprint that is subject of the authentication request based on whether at least one image of the fingerprint input matches at least one image processed into the personalized information and whether the characteristics of the rolled fingerprint input match characteristics of the fingerprint input processed into the personalized information.

The characteristic determination unit determines the direction in which the rolled fingerprint based on a central axis of the rolled fingerprint consecutively captured in the partial area.

The fingerprint recognition area is formed over the full area of the display module, and the control unit includes: a characteristic determination unit that determines an initial time for the rolled fingerprint input in the entire area, determines a direction in which the rolled fingerprint based on the initial time for the fingerprint input, determines a final time for the fingerprint input in the full area after the direction in which the rolled fingerprint has been determined, determines a total time required for the fingerprint input based on the initial time and the final time, determines an angle of the rolled fingerprint based on the direction in which the rolled fingerprint and the final time of the fingerprint input, and determines an input position of the rolled fingerprint during the total time required for the fingerprint input; an information management unit that manages the direction in which the rolled fingerprint, the initial time for the fingerprint input, the angle of the fingerprint, and the input position of the fingerprint as the personalized information; and a fingerprint authentication unit that authenticates the rolled fingerprint that is subject of the authentication request based on whether at least one image of the fingerprint input matches at least one image processed into the personalized information and whether the characteristics of the rolled fingerprint input match characteristics of the fingerprint input processed into the personalized information.

The characteristic determination unit determines the direction in which the rolled fingerprint based on a central axis of the rolled fingerprint consecutively captured in the full area, determines the angle based on the central axis of the rolled fingerprint captured in the full area during the total time required for the fingerprint input, and determines the input position based on coordinates of X and Y axis on a central axis of the rolled fingerprint in the full area.

The angle is determined based on the tilt of the rolled fingerprint on the X and Y axes in the full area.

DETAILED DESCRIPTION

Hereinafter, the present disclosure will be described in detail.

In the present disclosure, "including" a certain component means that other components may be further included rather than they are excluded, unless specifically stated to the contrary.

The present disclosure is aimed at providing technology for processing fingerprints of an electronic device for improving security in fingerprint registration and recognition by using how each rolled fingerprint is input and the characteristics of each individual input fingerprint. In particular, the present disclosure is aimed at enhancing security in fingerprint registration and recognition by using the characteristics of each individual rolled fingerprint in various ways.

An electronic device according to an embodiment of the present disclosure may be at least one of a smartphone, a tablet personal computer (tablet PC), an e-book reader, a laptop personal computer (laptop PC), a netbook computer, a desktop personal computer (desktop PC), a wearable device (e.g., a smart watch, smart glasses, a head-mounted device (HMD), electronic clothing, an electronic bracelet, an electronic necklace, a smart mirror, etc.), for example.

An electronic device according to another embodiment of the present disclosure may be at least one of a portable medical device (e.g., a blood sugar monitor, a heart rate monitor, a blood pressure monitor, a body temperature monitor, etc.), a navigation device, an automotive infotainment device, a marine electronic equipment (e.g., a marine navigation device, gyrocompasses, etc.), avionics, a security device, an automotive head unit, a point of sales (POS) of stores, and an internet of things device.

The electronic devices according to the embodiments of the present disclosure are not limited to the above-mentioned devices, and examples of thereof may include new electronic devices as related technologies develop.

Hereinafter, the embodiments of the present disclosure will be described in detail with reference to the attached drawings.

Figure 1:
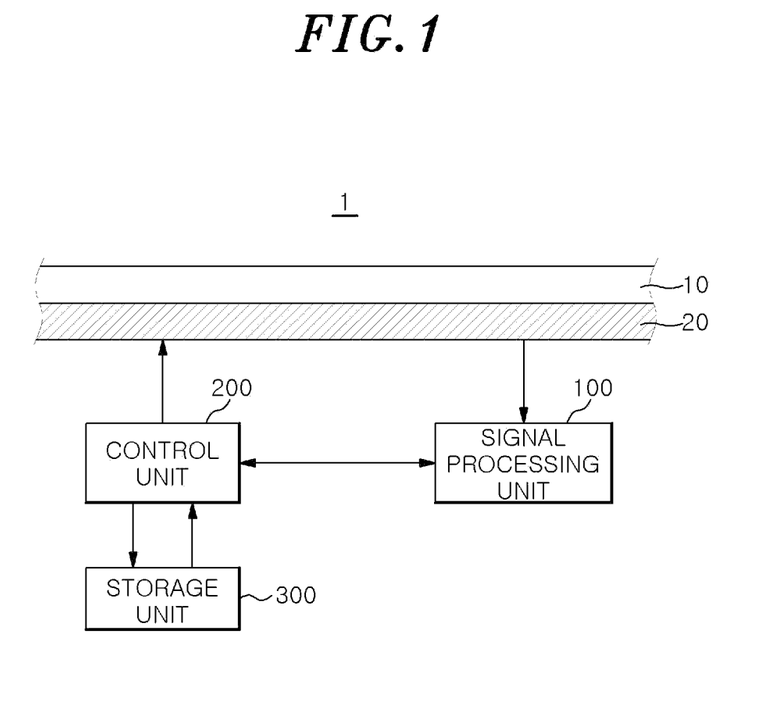
FIG. 1 is a view of components of an electronic device according to an embodiment of the present disclosure.

FIG. 1 is a view of components of an electronic device 1 according to an embodiment of the present disclosure.

As shown in FIG. 1, the electronic device 1 according to an embodiment of the present disclosure may include a display module 10, a fingerprint recognition module 20, a signal processing unit 100, a control unit 200, and a storage unit 300.

The display module 10 may be a module for displaying information about the operation of the electronic device 1, etc. and may include a cover window, a display panel, a touch panel, etc. (not shown). Examples of the display panel may include a liquid crystal display (LCD), a light emitting diode (LED), an organic LED (OLED), a micro electro mechanical system (MEMS), electronic paper, etc., and may display a plurality of fingerprint information recognition areas for recognizing fingerprint information through the fingerprint recognition module 20, which will be described below. The touch panel may be included in the display module and, may convert information input by a user's touch into an electrical signal by a capacitive method, etc.

The fingerprint recognition module 20 may be connected to the display module 10 and may recognize a user's fingerprint in contact with the surface of the display module 10. The fingerprint recognition module 20 may include, for example, an ultrasonic module for recognizing fingerprint information. In this case, the fingerprint information recognition module 20 may generate and output ultrasonic waves directed to the fingerprint information recognition area of the display module 10, and may determine the shape of a user's fingerprint by recognizing ultrasonic waves reflected from the fingerprint of the user's finger. In FIG. 1, the fingerprint recognition module 20 is disposed beneath the display module 10, but this is only an example to help understand the embodiment. The fingerprint recognition module 20 may be integrated into the display module 10 or placed on the side of the edge of the electronic device 1, which means it may be included in the electronic device 1 in various forms.

The signal processing unit 100 may sense a user's touching or pattern dragging from an electrical signal resulting from the touch input or the pattern drag input of the display module 10, and may process a value received from the fingerprint information recognition module 20 to read the user's input fingerprint. In addition, the signal processing unit 100 may generate a plurality of fingerprint recognition areas for recognizing the user's input fingerprint through the fingerprint recognition module 20.

Figure 2:
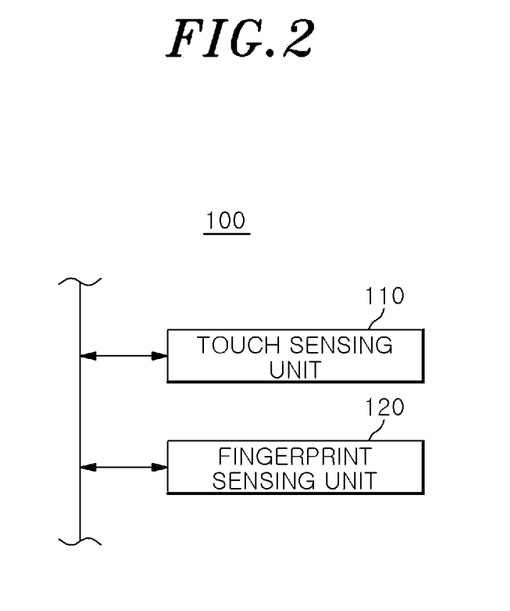
FIG. 2 is a block diagram for specifically illustrating features of the signal processing unit in FIG. 1.

FIG. 2 is a block diagram for specifically illustrating features of the signal processing unit 100 in FIG. 1.

As shown in FIG. 2, the signal processing unit 100 may include a touch sensing unit 110 and a fingerprint sensing unit 120.

The touch sensing unit 110 may sense a user's touching from an electrical signal resulting from the user's touch input through the display module 10.

The fingerprint sensing unit 120 may be electrically connected to the fingerprint recognition module 20 and process a value received from the fingerprint recognition module 20 to sense a user's input fingerprint.

Referring back to FIG. 1, the control unit 200 may include, for example, a microprocessor-based control processing unit, a graphics processing unit, etc., and may be operated by an electronic device having at least one core. The control unit 200 may read data or commands stored in the storage unit 300, which will be described below, and select any one therefrom, and may record newly input data or commands in the storage unit 300. In addition, the control unit 200 may modify or delete data or commands that have been already recorded.

In particular, the control unit 200 may determine the type of fingerprint input to the electronic device 1 according to an embodiment of the present disclosure, and, when the input fingerprint is a rolled fingerprint, the control unit 200 may process the characteristics of the rolled fingerprint and a video showing the rolled fingerprint being input into personalized information and store it in the storage unit 300, may load the personalized information from the storage unit 300 at the request for authentication of a rolled fingerprint, and, at the request for authentication by the electronic device 1, may output the result of authentication of the fingerprint based on whether the characteristics of the rolled fingerprint and a video showing the rolled fingerprint being input match the personalized information.

In addition, the control unit 200 may differentially manage personalized information including the characteristics of user's input fingerprints depending on the recognition range of the fingerprint recognition areas of the electronic device 1 and personalize authentication of the users' fingerprints based on this.

Here, the fingerprint recognition areas may correspond to a plurality of locations on the display module 10, and the plurality of fingerprint recognition areas may be divided at least on a partial area of the display module 10 or formed over the entire area of the display module 10. The recognition range of this fingerprint recognition area may be set differently depending on the method of inputting a fingerprint into the electronic device 1 or specifications of hardware of the electronic device 1.

At least one command or data executable by the control unit 200 may be stored in the storage unit 300, and it may be possible for the control unit 200 to select any one from the stored commands or data. The storage unit 300 may store a video of a rolled fingerprint input on the display module 10 showing some or all of the fingerprint recognition areas according to an embodiment of the present disclosure, and may include a computer program including commands for processing at least one of the direction in which a fingerprint rolls, the time taken for the fingerprint to be input, the angle of the fingerprint, and the location of the fingerprint, which are shown in the video, as personalized information and storing it. In addition, the storage unit 300 may store a computer program, etc. including a command for performing authentication of a fingerprint based on personalized information including a video of a rolled fingerprint that has been already stored and the characteristics thereof when a video of a rolled fingerprint and the characteristics thereof recorded in the video are input. The storage unit 300 may be a storage medium such as a random-access memory (RAM) or a read only memory (ROM), and is not limited to a specific storage medium.

Figure 3:
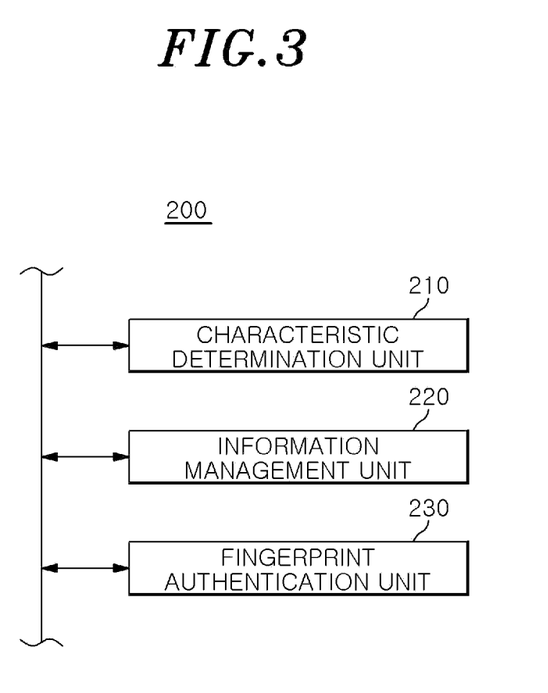
FIG. 3 is a block diagram for specifically illustrating features of the control unit in FIG. 1.

FIG. 3 is a block diagram for specifically illustrating features of the control unit 200 in FIG. 1.

As shown in FIG. 3, the control unit 200 may include a characteristic determination unit 210, an information management unit 220, and a fingerprint authentication unit 230.

The control unit 200 in FIG. 3 may differentially determine characteristics of an input rolled fingerprint depending on whether fingerprint recognition areas are formed over a partial area or the entire area of the display module 10 and manage them as personalized information.

First, it will be described how a fingerprint is authenticated when fingerprint recognition areas are formed over a partial area of the display module 10.

When fingerprint recognition areas are formed over a partial area of the display module 10, the characteristic determination unit 210 may determine the time at which a fingerprint began to be input in the partial area, determine the direction in which the rolled fingerprint based on that time, determine the time when inputting of the fingerprint ended in the partial area after the determination on the direction had been completed, and determine the time taken for the rolled fingerprint to be input based on the start time and the end time. Here, the characteristic determination unit 210 may determine the direction in which the fingerprint rolled based on the central axis of the rolled fingerprint continuously captured in the partial area.

The information management unit 220 may store information on the direction in which the rolled fingerprint and the time taken for the fingerprint to be input, which has been determined by the characteristic determination unit 210 in the storage unit 300 and manage it as personalized information. The personalized information may be loaded by the information management unit 220 when authenticating a fingerprint.

The fingerprint authentication unit 230 may authenticate an input fingerprint based on whether the video of the rolled fingerprint being input matches with a video processed as personalization information and whether the characteristics (the rotation direction and the input time) of the rolled fingerprint match characteristics processed as personalization information.

Next, it will be described how a fingerprint is authenticated when fingerprint recognition areas are formed over the entire area of the display module 10.

When fingerprint recognition areas are formed over the entire area of the display module 10, the characteristic determination unit 210 may determine the time at which a fingerprint began to be input in the entire area, determine the direction in which the rolled fingerprint based on that time, determine the time when inputting of the fingerprint ended in the entire area after the determination on the direction had been completed, determine the time taken for the rolled fingerprint to be input based on the start time and the end time, determine the angle of the rolled fingerprint based on the start time and the end time, and determine the location where the rolled fingerprint was input during the period of time taken for the fingerprint to be input. Here, the characteristic determination unit 210 may determine the direction in which the fingerprint rolled based on the central axis of the rolled fingerprint continuously captured in the entire area, determine the angle of the rolled fingerprint based on the central axis of the rolled fingerprint captured in the entire area at the input time, and determine the location where the fingerprint was input based on the X, Y coordinates on the central axis of the rolled fingerprint in the entire area. Here, the angle may be determined based on the tilt of the rolled fingerprint on the X and Y axes in the entire area.

The information management unit 220 may store, in the storage unit 300, information on the direction in which a rolled fingerprint, the time taken for the fingerprint to be input, the angle of the fingerprint, and the location where the fingerprint was input, which have been determined by the characteristic determination unit 210, and manage it as personalized information. The personalized information may be loaded by the information management unit 220 when authenticating a fingerprint.

The fingerprint authentication unit 230 may authenticate an input fingerprint based on whether the video of the rolled fingerprint being input matches with a video processed as personalization information and whether the characteristics (the rotation direction, the input time, the angle, and the location) of the rolled fingerprint match characteristics processed as personalization information.

Hereinafter, along with the above-described features, a method of registering a fingerprint and a method of authenticating a fingerprint through the electronic device 1 according to an embodiment of the present disclosure will be described in detail with reference to FIGS. 4 to 9 attached hereto.

Figure 4:
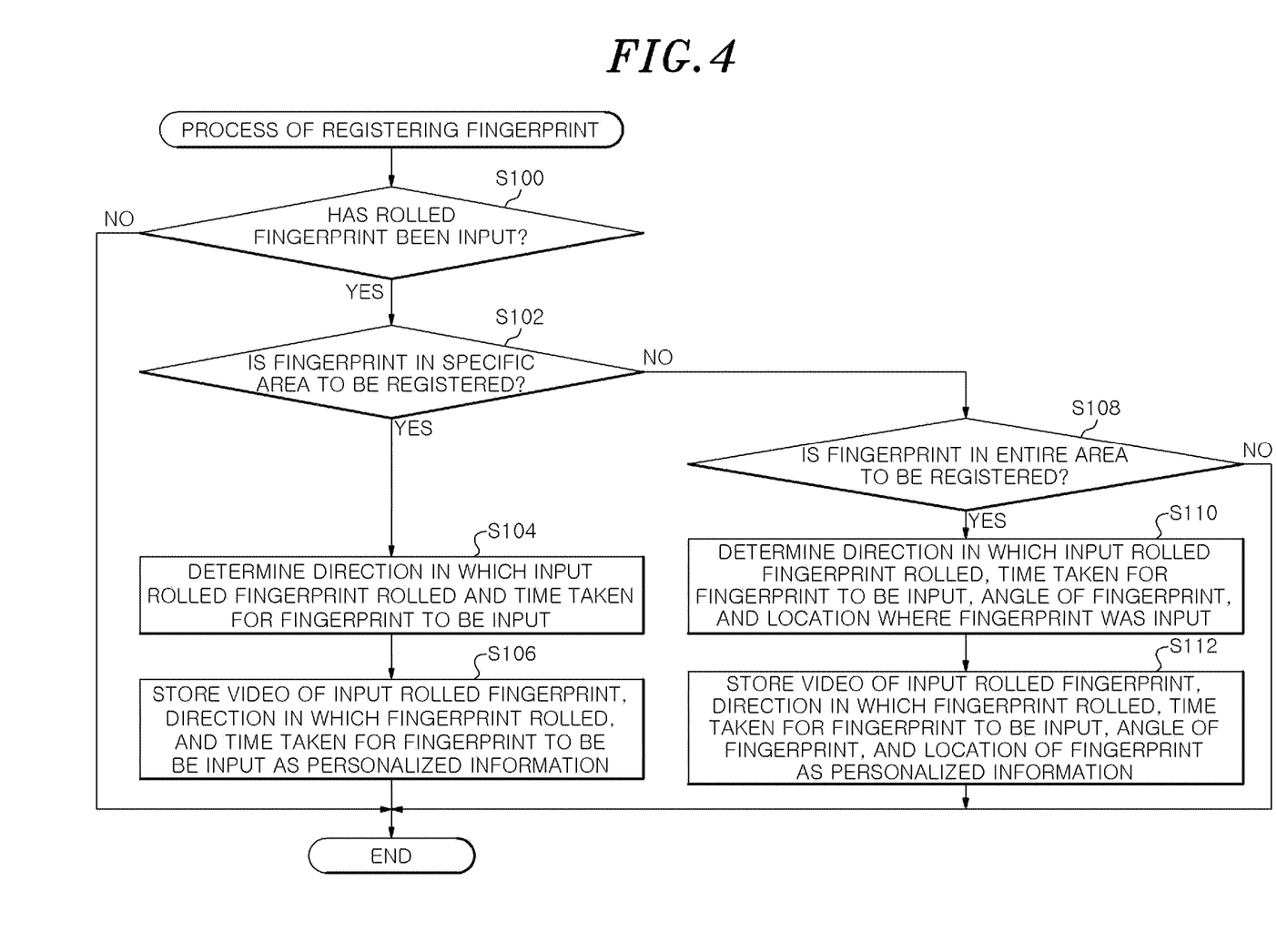
FIG. 4 is a flowchart for illustrating a method of registering a fingerprint through the electronic device according to an embodiment of the present disclosure.

First, FIG. 4 is a flowchart for illustrating a method of registering a fingerprint through the electronic device 1 according to an embodiment of the present disclosure.

As shown in FIG. 4, in the process of registering a fingerprint, the control unit 200 of the electronic device 1 may sense the fingerprint input to fingerprint recognition areas formed on the display module 10 at S100, and may determine the recognition range of the fingerprint recognition areas when the sensed fingerprint is a rolled fingerprint at S102.

When the fingerprint recognition areas of the electronic device 1 have a recognition range of a partial area of the display module 10, the characteristics of the rolled fingerprint, e.g., the direction in which the fingerprint rolled and the time when it was input, may be determined based on a video of the rolled fingerprint being input at S104.

After the characteristics of the rolled fingerprint, e.g., the direction in which the fingerprint rolled and the time when it was input, have been determined, the control unit 200 may store the characteristics and the video as personalized information in the storage unit 300 at S106.

On the other hand, when the fingerprint recognition areas of the electronic device 1 have a recognition range of the entire area of the display module 10 at S108, the characteristics of the rolled fingerprint, e.g., the direction in which the fingerprint rolled, the time taken for the fingerprint to be input, the angle of the fingerprint, and the location of the fingerprint, may be determined based on a video of the rolled fingerprint being input at S110.

After the characteristics of the rolled fingerprint, e.g., the direction in which the fingerprint rolled, the time taken for the fingerprint to be input, the angle of the fingerprint, and the location of the fingerprint, have been determined, the control unit 200 may store the characteristics and the video as personalized information in the storage unit 300 at S112.

Figure 5:
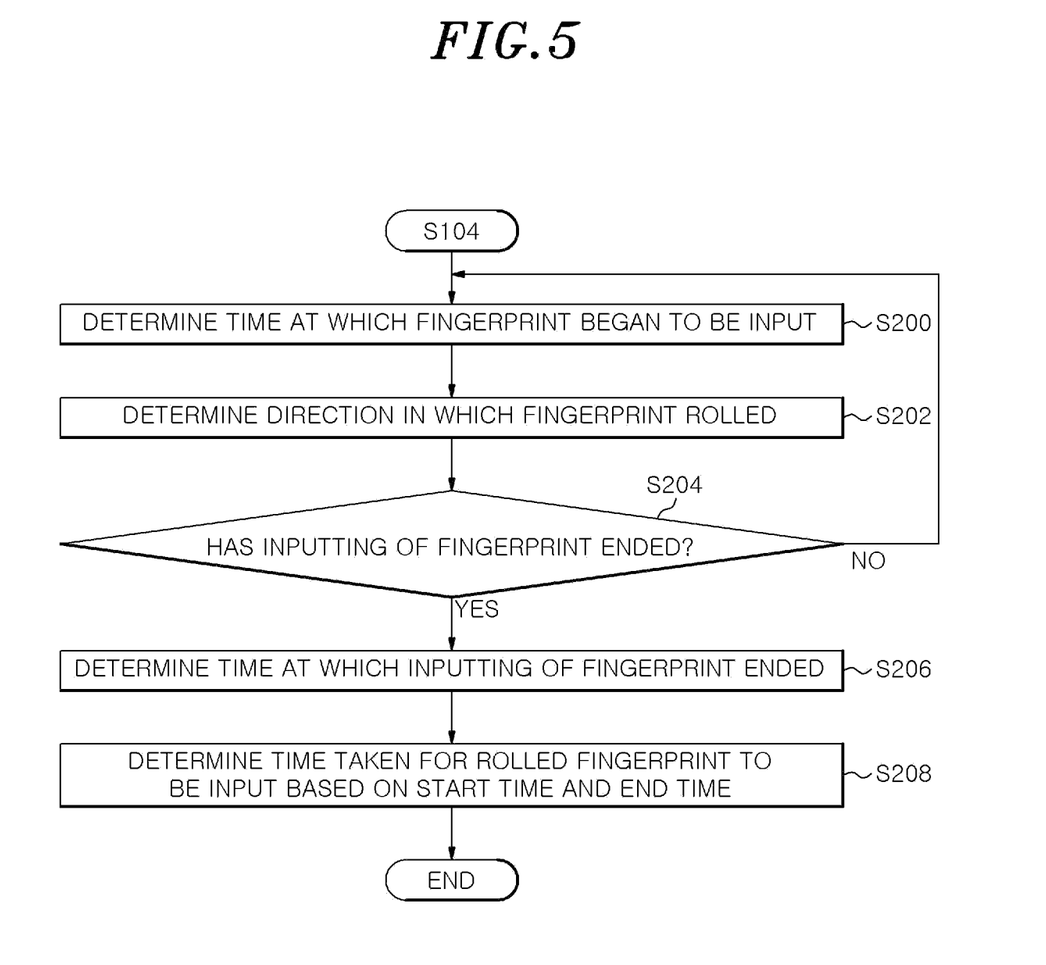
FIG. 5 is a detailed flowchart for illustrating the process of determining the direction in which a rolled fingerprint rolled and the time taken for the fingerprint to be input in FIG. 4.

FIG. 5 is a detailed flowchart for illustrating the process of determining the direction in which a fingerprint rolled and the time taken for the fingerprint to be input in FIG. 4 (S104).

As shown in FIG. 5, when a rolled fingerprint is input by the display module 10, the control unit 200 may determine the time when a partial area of the rolled fingerprint began to be input by the characteristic determination unit 210 at S200.

Thereafter, the characteristic determination unit 210 may determine the direction in which the rolled fingerprint based on the time when a partial area of the rolled fingerprint began to be input at S202. Here, the direction in which the rolled fingerprint may be determined based on the central axis of the rolled fingerprint continuously captured in some of the fingerprint recognition areas.

After the direction in which the rolled fingerprint has been determined at S204, the control unit 200 may determine the time at which the inputting of the fingerprint ended in some areas at S206.

When the time at which the inputting of the fingerprint ended is determined, the control unit 200 may determine the time taken for the rolled fingerprint to be input based on the start time and the end time at S208. The time may refer to the time elapsed while the rolled fingerprint was input.

Figure 6A:
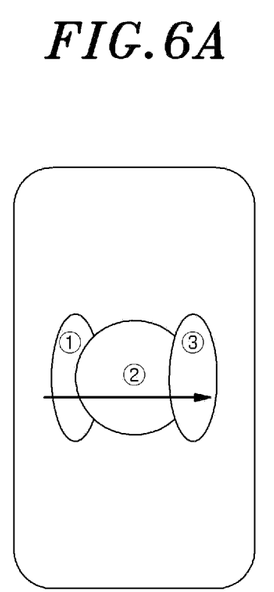
FIGS. 6A-6B are views for illustrating how the direction in which a rolled fingerprint rolled and the time taken for the rolled fingerprint to be input are determined as shown in FIG. 5.
Figure 6B:
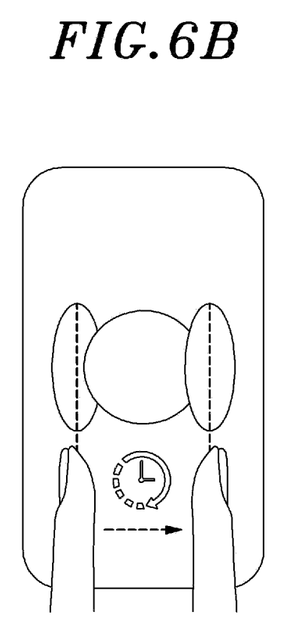

FIGS. 6A-6B are view for illustrating how the direction in which a rolled fingerprint and the time taken for the rolled fingerprint to be input are determined as shown in FIG. 5.

Figure FIG. 6A shows how the direction in which a rolled fingerprint is rolling is input. As shown in figure FIG. 6A, the direction in which the rolled fingerprint that is being input or has been fully input is rolling may be determined based on the central axis of the rolled fingerprint that has been continuously captured since the fingerprint begun to be input. Figure FIG. 6B shows the fingerprint rolling from the left to the right in some of fingerprint recognition areas on the display module 10, and the control unit 200 may determine the direction in which the rolled fingerprint is rolling through the characteristic determination unit 210.

Figure 7:
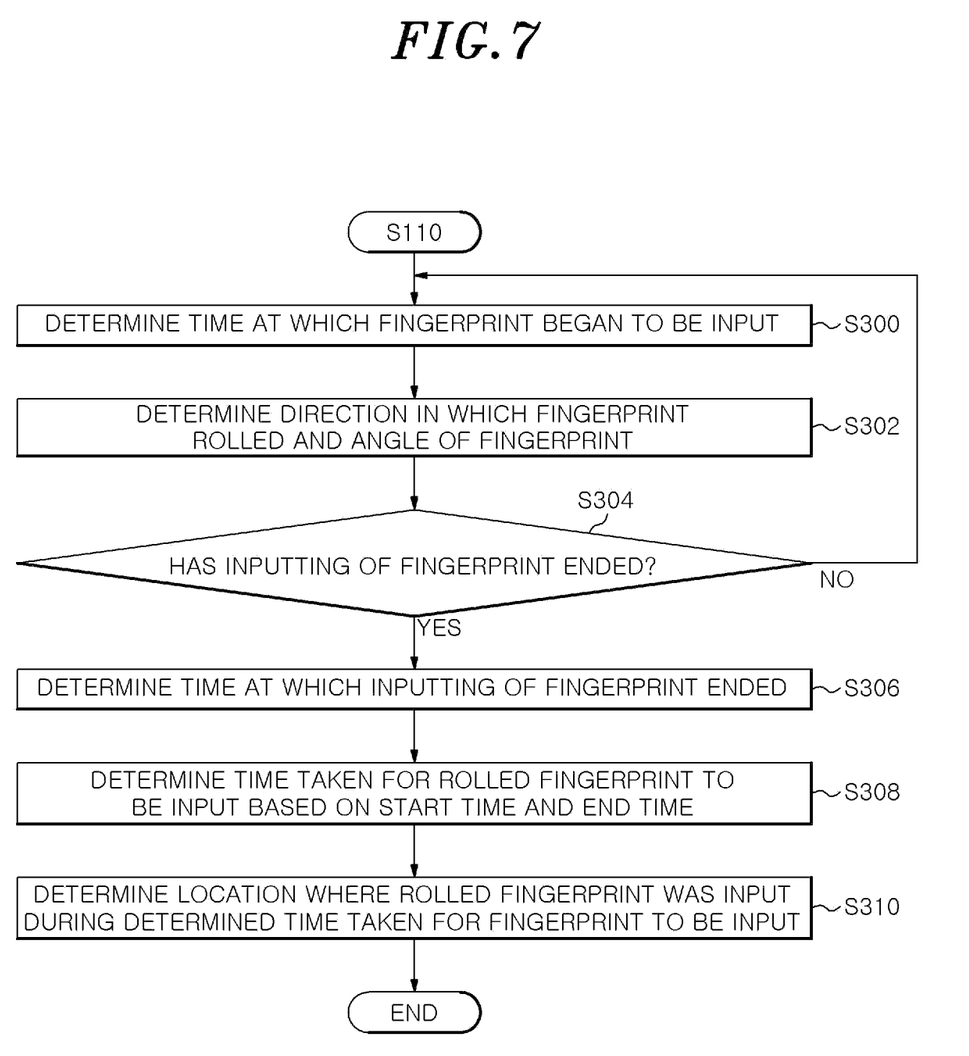
FIG. 7 is a detailed flowchart for illustrating the process of determining the direction in which the rolled fingerprint rolled, the time taken for the fingerprint to be input, the angle of the fingerprint, and the location of the fingerprint, as shown in FIG. 4.

FIG. 7 is a detailed flowchart for illustrating the process of registering a fingerprint in the entire area, that is, the process of determining the direction in which the rolled fingerprint, the time taken for the fingerprint to be input, the angle of the fingerprint, and the location of the fingerprint, as shown in FIG. 4.

As shown in FIG. 7, after a rolled fingerprint has been input by the display module 10, the control unit 200 may determine the time at which the rolled fingerprint began to be input in the entire area by through the characteristic determination unit 210 at S300.

Thereafter, the characteristic determination unit 210 may determine the direction in which the rolled fingerprint and the angle of the fingerprint based on the time at which the fingerprint began to be input at S302.

After the direction in which the rolled fingerprint and the angle of the fingerprint have been determined at S304, the control unit 200 may determine the time at which the inputting of the fingerprint ended through the characteristic determination unit 210 at S306. Here, the direction in which the rolled fingerprint may be determined based on the central axis of the rolled fingerprint continuously captured in some of the fingerprint recognition areas.

When the time at which the inputting of the fingerprint ended is determined, the control unit 200 may determine the time taken for the rolled fingerprint to be input based on the start time and the end time at S308.

The order in which the time at which the inputting of the rolled fingerprint began, the direction in which the fingerprint rolled, the angle of the fingerprint, and the time at which the inputting of the rolled fingerprint ended are determined has been provided as an example for describing the embodiment in FIG. 7., and the order in the flowchart may be changed as needed. For example, the order may be as follows. After the time at which the inputting of the rolled fingerprint began has been determined, the direction in which the fingerprint rolled is determined. Next, after the time at which the inputting of the rolled fingerprint ended in the entire area has been determined, the time taken for the fingerprint to be input is determined based on the start time and the end time. At last, the angle of the fingerprint is determined based on the direction in which the fingerprint rolled and the time at which the inputting of the rolled fingerprint ended.

After the time taken for the fingerprint to be input has been determined, the control unit 200 may determine the location where the rolled fingerprint was input during the determined period of time at S310. The time may refer to the time elapsed while the rolled fingerprint was input.

Figure 8A:
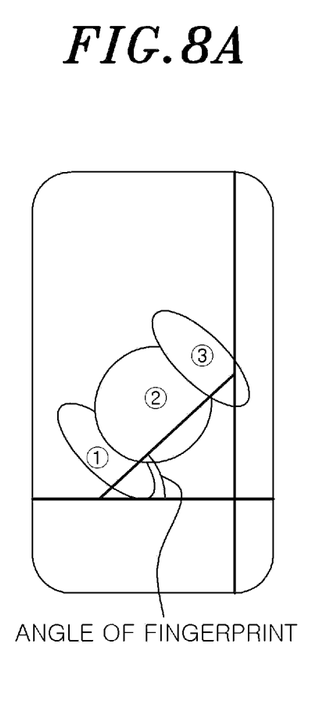
FIGS. 8A-8B are views for illustrating how the angle of a rolled fingerprint and the location where the rolled fingerprint was input are determined as shown in FIG. 7.
Figure 8B:
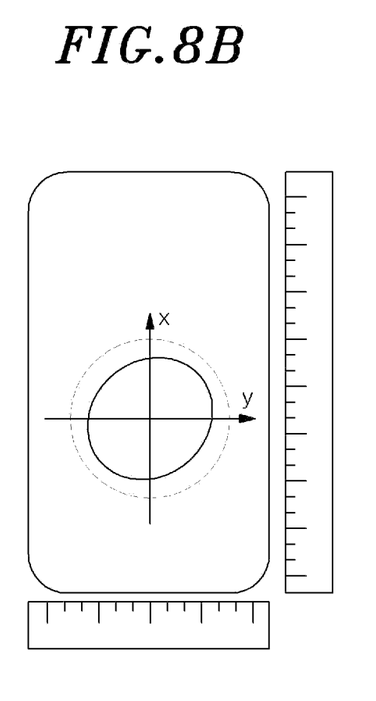

FIGS. 8A-8B are views for illustrating how the angle of a rolled fingerprint and the location where the rolled fingerprint was input are determined as shown in FIG. 7, and is a view for illustrating other characteristics of the rolled fingerprint reflected in addition to the direction in which the fingerprint rolled and the time taken for the fingerprint to be input.

Figure FIG. 8A illustrates how the angle of a rolled fingerprint is input. As shown in Figure FIG. 8A, the angle of the rolled fingerprint may be determined based on the central axis of the rolled fingerprint that has been captured in the entire area during the period of time taken for the fingerprint to be input since the fingerprint begun to be input. The angle of the rolled fingerprint may be obtained by determining the tilt of the rolled fingerprint based on the X-axis and the Y-axis in the two-dimensional area of a tilt sensor (not shown) included in the electronic device 1.

In addition, as shown in figure FIG. 8B, the position where the rolled fingerprint is input may be determined based on the X, Y coordinates on the central axis of the rolled fingerprint throughout the fingerprint recognition area of the display module 10.

Figure 9A:
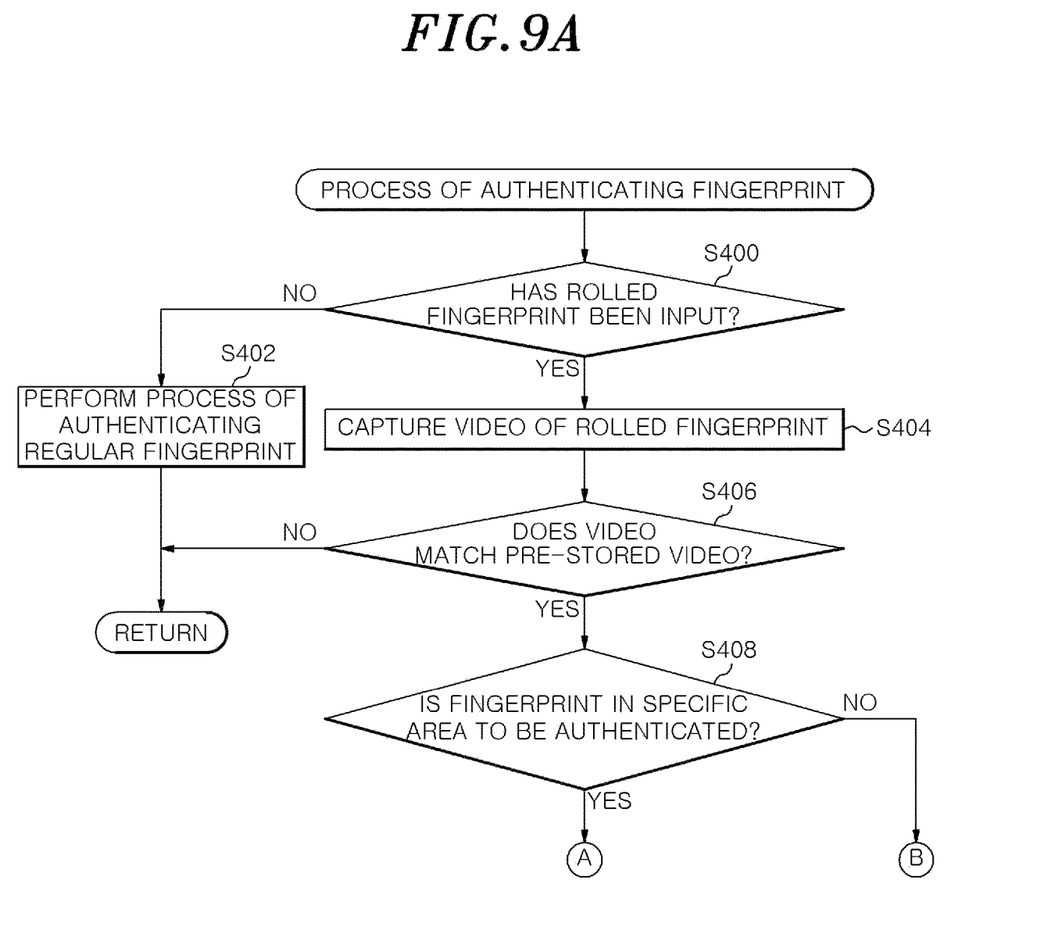
FIGS. 9A-9B are flowcharts for illustrating a method of authenticating a fingerprint through the electronic device according to an embodiment of the present disclosure.
Figure 9B:
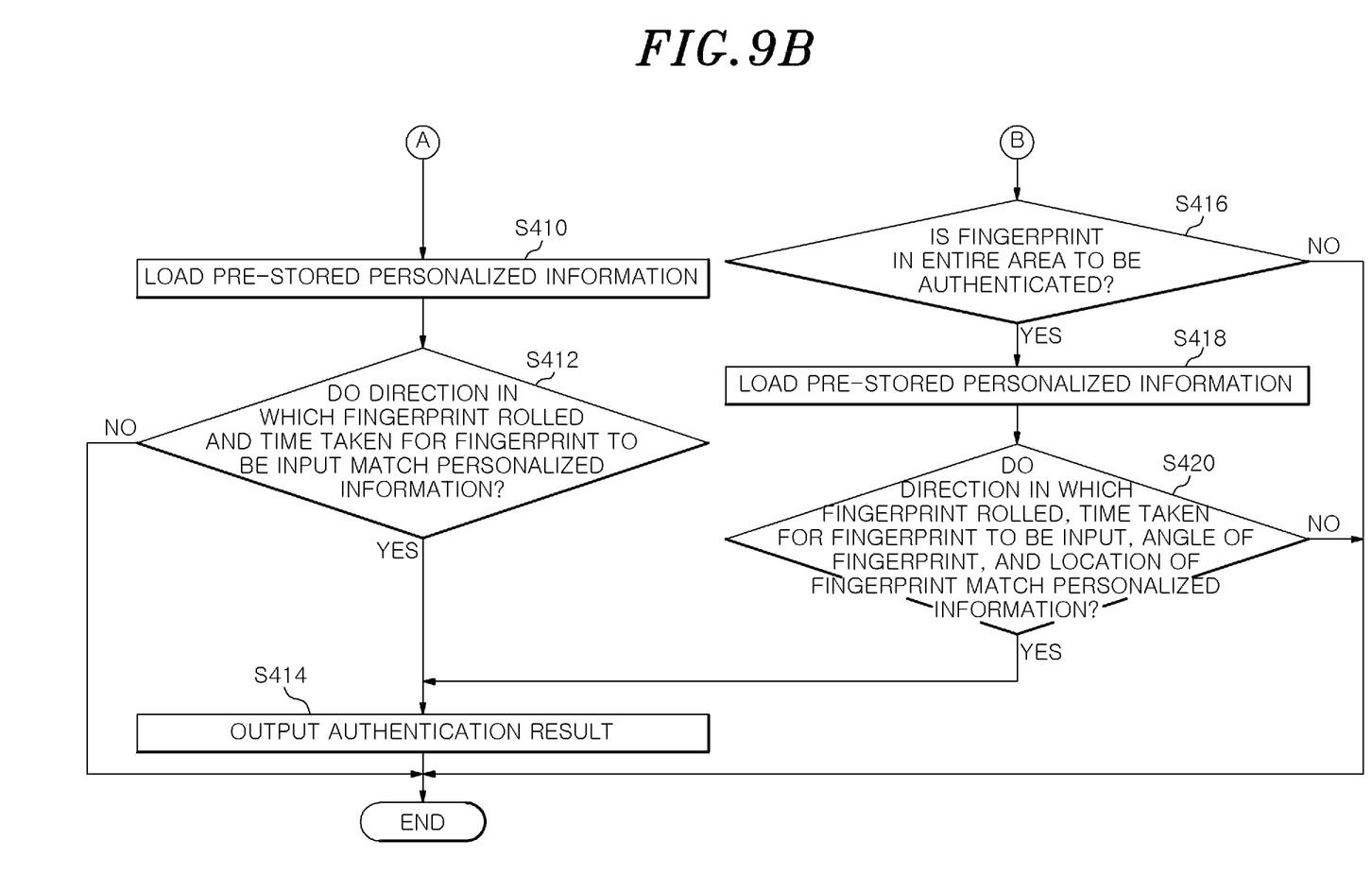

FIGS. 9A-9B are flowcharts for illustrating a method of authenticating a fingerprint through the electronic device 1 according to an embodiment of the present disclosure.

As shown in FIGS. 9A-9B, in the process of authenticating a fingerprint, the control unit 200 of the electronic device 1 may sense the fingerprint input into a fingerprint recognition area formed on the display module 10 at S400.

When the sensed fingerprint is a regular fingerprint, the control unit 200 may perform a process to authenticate a regular fingerprint at S402. The process of authenticating a regular fingerprint may include processes of capturing a video of the fingerprint, determining whether the video of the fingerprint matches a pre-stored video, and outputting the result of authentication of the fingerprint based on the result of the determination. Such a process to authenticate a regular fingerprint is not an essential component of the embodiment of the present disclosure, so a detailed description thereof will not be provided.

Meanwhile, when the sensed fingerprint is a rolled fingerprint, the control unit 200 may capture a video of the input rolled fingerprint and determine whether the captured video matches a pre-stored video of a rolled fingerprint at S406.

When the captured video of the rolled fingerprint matches the pre-stored video of the rolled fingerprint, the control unit 200 may determine the recognition range of the fingerprint recognition area of the electronic device 1 at S408.

When the fingerprint recognition areas of the electronic device 1 have a recognition range for a partial area of the display module 10, the control unit 200 may load personalized information previously stored in the storage unit 300 at S410. The pre-stored personalized information may include the characteristics of the rolled fingerprint input into some of the fingerprint recognition areas, and the characteristics may include the direction in which the fingerprint rolled, the time taken for the fingerprint to be input, etc., which have been previously stored.

Thereafter, the control unit 200 may determine whether the direction in which the rolled fingerprint rolls and the time taken for the fingerprint to be input, which have been loaded, match the direction in which the fingerprint rolls and the time taken for the fingerprint to be input, which have been input at S412, and may output the result of authentication of the fingerprint when they match each other at S414. For example, the result of the authentication of the fingerprint may be output to the display module 10 as a message notifying the success of the authentication, or may be the result of performing a subsequent process after the fingerprint authentication.

On the other hand, when the fingerprint recognition areas of the electronic device 1 have a recognition range for the entire area of the display module 10 at S408, the control unit 200 may load personalized information previously stored in the storage unit 300 at S418. The pre-stored personalized information may include the characteristics of the rolled fingerprint input into all of the fingerprint recognition areas, and the characteristics may include the direction in which the fingerprint rolls, the time taken for the fingerprint to be input, the angle of the fingerprint, the location of the fingerprint, etc., which have been previously stored.

Thereafter, the control unit 200 may determine whether the direction in which the rolled fingerprint rolls, the time taken for the fingerprint to be input, the angle of the fingerprint, and the location of the fingerprint, which have been loaded, match the direction in which the fingerprint rolls, the time taken for the fingerprint to be input, the angle of the fingerprint, and the location of the fingerprint, which have been input at S420, and may output the result of authentication of the fingerprint when they match each other at S414. For example, the result of the authentication of the fingerprint may be output to the display module 10 as a message notifying the success of the authentication, or may be the result of performing a subsequent process after the fingerprint authentication.

Meanwhile, in accordance with an embodiment of the present disclosure, the at least one image may consist of a plurality of images consecutively captured by fingerprint sensing unit on a time basis and the plurality of images may be stored into storage unit in a form of a video file.

According to the above-described embodiment of the present invention, it is expected that security in fingerprint recognition may be improved by using how each rolled fingerprint is input and the characteristics of each individual input fingerprint for fingerprint registration and recognition. In particular, it is expected that security and reliability may be further secured in platforms such as systems for electronic financial transactions and systems for e-commerce by using the direction in which a fingerprint rolls, the time taken for the fingerprint to be input, the angle of the fingerprint, and the location of the fingerprint for fingerprint registration and recognition.

Although the embodiments of the present disclosure have been described above with reference to the accompanying drawings, those of ordinary skill in the art to which the present disclosure pertains will understand that the present disclosure can be implemented in other specific forms without changing the technical spirit or essential features thereof. For example, although a person skilled in the art may change the material, size, etc. of each element depending on the field of application, or combine or substitute embodiments to implement it in a form not clearly disclosed in the embodiments of the present disclosure, this also does not depart from the scope of the present disclosure. Therefore, the above-described embodiments are illustrative in all respects and should not be understood as limiting, and it should be said that these modified embodiments are included in the technical idea described in the claims of the present disclosure.

What is claimed is:

1. A method for registering a fingerprint of a user through an electronic device, comprising:
    sensing a fingerprint input into a fingerprint recognition area formed on a display module of the electronic device to capture at least one image of the fingerprint input;
    determining characteristics of the fingerprint input based on the at least one image of the fingerprint input when the fingerprint input is a rolled fingerprint; and
    storing the at least one image of the fingerprint input and the characteristics of the fingerprint input as personalized information of the user,
    wherein when the fingerprint recognition area is formed on a partial area of the display module, the determining of the characteristics of the fingerprint input comprises:
   determining an initial time for the fingerprint input in the partial area;
   determining a direction of the rolled fingerprint based on the initial time for the fingerprint input;
   determining a final time for the fingerprint input in the partial area after the direction in which the rolled fingerprint has been determined;
   determining a total time required for the fingerprint input based on the initial time and the final time; and
   setting the direction of the rolled fingerprint and the total time required for the fingerprint input as the characteristics of the fingerprint input.

2. The method of claim 1, wherein the direction of the rolled fingerprint is determined based on a central axis of the rolled fingerprint consecutively captured in the partial area.

3. The method of claim 1,
wherein when the fingerprint recognition area is formed on a full area of the display module,
the determining of the characteristics of the fingerprint input comprises:
   determining an initial time for the fingerprint input in the full area;
   determining a direction of the rolled fingerprint based on the initial time for the fingerprint input;
   determining a final time for the fingerprint input in the full area after the direction in which the rolled fingerprint has been determined;
   determining a total time required for the fingerprint input based on the initial time and the final time;
   determining an angle of the rolled fingerprint based on the direction in of the rolled fingerprint and the final time for the fingerprint input;
   determining an input position of the rolled fingerprint during the total time required for the fingerprint input; and
   setting the direction of the rolled fingerprint, the total time required for the fingerprint input, the angle of the rolled fingerprint, and the input position of the rolled fingerprint, as the characteristics of the fingerprint.

4. The method of claim 3, wherein the direction of the rolled fingerprint is determined based on a central axis of the rolled fingerprint consecutively captured in the full area.

5. The method of claim 4, wherein the angle of the rolled fingerprint is obtained by determining a tilt of the rolled fingerprint on X and Y axis in the full area based on the central axis of the rolled fingerprint captured in the full area during the total time required for the fingerprint input.

6. The method of claim 5, wherein the input position of the rolled fingerprint is determined based on coordinates of the X and Y axis on a central axis of the rolled fingerprint in the full area.

7. A method for authenticating a fingerprint of a user through an electronic device, comprising:
   sensing a fingerprint input into a fingerprint recognition area formed on a display module of the electronic device to capture at least one image of the fingerprint input and determining whether the at least one image of the fingerprint input matches with a pre-stored at least one image of the fingerprint input when the fingerprint input is a rolled fingerprint;
   determining characteristics of the rolled fingerprint into the fingerprint recognition area when the at least one image of the fingerprint input matches with the pre-stored at least one image of the fingerprint input;
   loading personalized information related to pre-stored characteristics of the rolled fingerprint;
   determining whether the characteristics of the rolled fingerprint match with the personalized information; and
   outputting a result of authentication of the fingerprint input when the characteristics of the rolled fingerprint match with the personalized information,
wherein when the fingerprint recognition area is formed on a partial area of the display module,
the determining of the characteristics of the fingerprint input comprises:
   determining an initial time for the fingerprint input in the partial area;
   determining a direction of the rolled fingerprint based on the initial time for the fingerprint input;
   determining a final time for the fingerprint input in the partial area after the direction of the rolled fingerprint has been determined; and
   determining a total time required for the fingerprint input based on the initial time and the final time.

8. The method of claim 7, wherein the direction of the rolled fingerprint is determined based on a central axis of the rolled fingerprint consecutively captured in the partial area.

9. The method of claim 7,
wherein when the fingerprint recognition area is formed on a full area of the display module,
the determining of the characteristics of the fingerprint input comprises:
   determining am initial time for the fingerprint input in the full area;
   determining a direction of the rolled fingerprint based on the initial time for the fingerprint input;
   determining a final time for the fingerprint input in the full area after the direction of the rolled fingerprint has been determined;
   determining a total time required for the fingerprint input based on the initial time and the final time;
   determining an angle of the rolled fingerprint based on the direction in of the rolled fingerprint and the final time for the fingerprint input; and
   determining an input position of the rolled fingerprint during the total time required for the rolled fingerprint.

10. The method of claim 9, wherein the direction of the rolled fingerprint is determined based on a central axis of the rolled fingerprint consecutively captured in the full area.

11. The method of claim 10, wherein the angle of the rolled fingerprint is obtained by determining a tilt of the rolled fingerprint on X and Y axis in the full area based on the central axis of the rolled fingerprint captured in the full area during the total time required for the fingerprint input.

12. The method of claim 11, wherein the input position of the rolled fingerprint is determined based on coordinates of the X and Y axis on a central axis of the rolled fingerprint in the full area.

13. An electronic device comprising:
   a display module;
   a fingerprint recognition module included in the display module;
   a signal processing unit to sense a fingerprint input into a fingerprint recognition area through the fingerprint recognition module; and
   a control unit to process at least one image of the fingerprint input and characteristics of the fingerprint input into personalized information and to store the personalized information in a storage unit when the fingerprint input is a rolled fingerprint, to load the personalized information from the storage unit at a request for authentication of the rolled fingerprint, and to output a result of authenticating the rolled fingerprint when the at least one image of the fingerprint input and the characteristics of the fingerprint input match with the personalized information, wherein when the fingerprint recognition area is formed on a partial area of the display module, the control unit includes:

a characteristic determination unit configured to determine an initial time for the rolled fingerprint in the partial area, determine a direction of the rolled fingerprint based on the initial time for the fingerprint input, determine a final time for the fingerprint input in the partial area after the direction of the rolled fingerprint has been determined, and determine a total time required for the fingerprint input based on the initial time and the final time;

an information management unit configured to manage the direction of the rolled fingerprint and the total time required for the fingerprint input as the personalized information; and     a fingerprint authentication unit configured to authenticate the rolled fingerprint that is subject of the request for authentication when at least another image of the fingerprint input matches with the at least one image processed into the personalized information and when other characteristics of the fingerprint input match with the characteristics of the fingerprint input processed into the personalized information.

14. The electronic device of claim 13, wherein the characteristic determination unit determines the direction of the rolled fingerprint based on a central axis of the rolled fingerprint consecutively captured in the partial area.

15. The electronic device of claim 13, wherein when the fingerprint recognition area is formed on a full area of the display module,     the control unit includes:

the characteristic determination unit configured to determine an initial time for the rolled fingerprint in the full area, determine a direction of the rolled fingerprint based on the initial time for the fingerprint input, determine a final time for the fingerprint input in the full area after the direction of the rolled fingerprint has been determined, determine a total time required for the fingerprint input based on the initial time and the final time, determine an angle of the rolled fingerprint based on the direction of the rolled fingerprint and the final time of the fingerprint input, and determine an input position of the rolled fingerprint during the total time required for the fingerprint input;

an information management unit configured to manage the direction of the rolled fingerprint, the initial time for the fingerprint input, the angle of the rolled fingerprint, and the input position of the rolled fingerprint as the personalized information; and     a fingerprint authentication unit configured to authenticate the rolled fingerprint that is subject of the request for authentication when at least another image of the fingerprint input matches with the at least one image processed into the personalized information and other characteristics of the fingerprint input match with the characteristics of the fingerprint input processed into the personalized information.

16. The electronic device of claim 15, wherein the characteristic determination unit determines the direction of the rolled fingerprint based on a central axis of the rolled fingerprint consecutively captured in the full area, determines the angle based on the central axis of the rolled fingerprint captured in the full area during the total time required for the fingerprint input, and determines the input position based on coordinates of X axis and Y axis on a central axis of the rolled fingerprint in the full area.

17. The electronic device of claim 16, wherein the angle is determined based on a tilt of the rolled fingerprint on the X axis and Y axis in the full area.

\* \* \* \* \*